United States Patent Office 2,967,824
Patented Jan. 10, 1961

---

2,967,824

PROCESS OF DEODORIZING HYDROCARBONS OF PETROLEUM

Joseph Quiquerez, Gonfreville-l'Orcher, and Edouard Weisang, Le Havre, France, assignors to Compagnie Française de Raffinage, Paris, France, a corporation of France No Drawing. Filed June 18, 1957, Ser. No. 666,468

Claims priority, application France June 18, 1956

13 Claims. (Cl. 208—289)

The present invention relates to the deodorization of mixtures of hydrocarbons with high boiling points, obtained from the higher fractions of distillation of crude petroleum.

It is well known on the one hand that the petroleum products commonly known as middle distillates, thermal and catalytic, cycle stock, fuel oil, etc., obtained from crude petroleum by various methods, either by direct distillation or by catalytic or thermal cracking of previously extracted petroleum fractions, have a characteristic odour which is generally considered as bad and disagreeable. Hydrocarbon mixtures of this kind are employed either in combustion engines or for domestic or industrial heating purposes.

It is well known on the other hand that, especially in the case of products used for domestic heating, the manufacturers of petroleum products wish to deliver commercially products having an improved smell. In order to do this, they can either subject these products to various refining treatments, for example in alkaline or acid media, with the object of eliminating the constituents which cause the characteristic odour of the said products, or on the other hand, this odour can be masked by the addition to these products of compounds in the nature of perfumes which then act to conceal the odour.

On the contrary, there is no known technique which enables products having an acceptable odour to be prepared without subjecting them to such refining treatments or without masking only their basic odour, considered as unpleasant, by another odour which is considered as acceptable or even agreeable to the sense of smell.

The present invention resides in such a technique of preparation, which distinguishes it essentially from the method referred to above. It consists in deodorizing the hydrocarbon mixtures considered, either by the addition of solutions of compounds resulting from the condensation of an alkyl-imino-phenol with a salt of a metal of Group VIII of Mendeleef's classification, or by the direct addition of solutions of the said alkyl-imino-phenol and of the said metallic salt.

Various methods of carrying out the present invention will be explained in the course of the description which follows.

On the one hand, the applicants have found that the addition to petroleum fractions, the greater part of which boil at a temperature at least equal to 200° C., such as middle distillates, fuel-oils, thermal and catalytic, cycle stocks, etc., of solutions of a compound resulting from the condensation of an alkyl-imino-phenol with a salt of a metal of Group VIII of Mendeleef's classification in a solvent such as—this enumeration being in no way restrictive—alcohols, for example methanol, ethanol, isopropanol, etc., phenols, for example the various cresols, ketones, aromatic hydrocarbons, etc., is accompanied by an improvement in the odour of the said products and makes them more suitable for supply to the commercial market.

The applicants have further established that the addition to petroleum fractions, the greater part of which boil at a temperature at least equal to 200° C., such as middle distillates, fuel-oils, thermal and catalytic, cycle stocks, etc., of solutions of an alkyl-imino-phenol and an organic salt of a metal of Group VIII of Mendeleef's classification in a solvent such as—this enumeration being in no way restrictive—alcohols, for example methanol, ethanol, isopropanol, etc., phenols, for example the various cresols, ketones, aromatic hydrocarbons, etc., is accompanied by an improvement in the odour of the said products which makes them more suitable for supply to the commercial market.

As an alkyl-imino-phenol, it is of especial advantage to employ certain Schiff bases resulting from the condensation of an ortho-benzaldehyde on an aliphatic diamine and, as a metallic salt of Group VIII, a cobalt salt.

In addition, the applicants have found that the addition of a lead salt to the deodorizing solutions facilitates the rapid production of the deodorizing effect of the products.

There are given below, by way of examples of typical deodorizing solutions, without such enumeration being in any way considered as restrictive; the following:

1. SOLUTION TYPE I

| | Grams |
|---|---|
| Bi-disalicylal-ethylene-diamino-dicobalt | 40 |
| Naphthenate of lead (20% of lead) | 40 |
| Methanol, up to 1,000 cu. cm. | |

The bi-disalicylal-ethylene-diamino-dicobalt can furthermore be replaced by the cobalt derivative of disalicylalpropylene di-imine.

2. SOLUTION TYPE II

| | Parts |
|---|---|
| Bi-disalicylal-ethylene-diamino-dicobalt | 10 |
| Litharge | 10 |
| Tricresol | 100 |
| Toluene | 20 |

In this case also the bi-disalicylal-ethylene-diamino-dicobalt may be replaced by the derivative of disalicylalpropylene di-imine.

3. SOLUTION TYPE III

Schiff base (in a solution of 80% by weight in toluene).

| | | |
|---|---|---|
| Disalicylal-ethylene-di-imine | kgs | 2.37 |
| or | | |
| Disalicylal-propylene di-imine | kgs | 3.12 |
| Naphthenate of cobalt (at 6% cobalt) | kgs | 8.7 |
| Naphthenate of lead (at 20% lead) | kgs | 15 |
| Aromatic solvent | litres | 125 |

To the products which are to be deodorized, there are added quantities of the order of 0.01 to 0.1% by weight of these deodorizing solutions, and it is found that after several hours—of the order of 12 to 24 hours—the products have lost all their disagreeable odour, and may be considered as deodorized.

It is to be observed that the said additions of deodorizing solutions to the petroleum products may be effected either directly in the storage tanks of the refineries, or the products are sent as soon as they are produced, either into containers in which they are transported, at the time of loading, or again simply into the tank of the retail seller or even the user.

With the object of illustrating deodorized products of this kind, a number of examples of the method forming the object of the invention are given below without any sense of limitation.

Example 1

To one cubic metre of middle distillate produced from a crude petroleum of Iraq origin, the characteristics of which are as follows: initial and final boiling points 212° to 371° C.; density at 15° C. 0.836, there is added either 500 cu. cm. of the type I solution specified above or 1,000 cu. cm. (disalicylal ethylene di-imine), or 750 cu. cm. (disalicylal propylene di-imine) of the solution type III specified above. After 24 hours, the disagreeable odour initially possessed by this middle distillate had disappeared and this product could then be considered as deodorized.

*Example II*

To one cubic metre of a catalytic cycle stock having a strong characteristic odour and the following characteristic features: initial and final boiling points, 212° to 325° C.; density at 15° C., 0.884, there was added 240 grams of the solution of type II. After 24 hours, all the unpleasant odour had disappeared.

*Example III*

To one cubic metre of fuel-oil, the characteristics of which were as follows: density at 15° C., 0.831; initial boiling point 197° C.; 10% boiling point 227° C.; 30% boiling point 277° C.; viscosity at 20° C. 4.47 cst., there was added 1 litre of the solution of type III. After 24 hours storage, the product, which at first had a disagreeable odour, could be considered as deodorized.

What we claim is:

1. A method for deodorizing fuel oil, thermal and catalytic cycle petroleum distillate stocks, petroleum middle distillates, and like petroleum distillation fractions, having a preponderant proportion of hydrocarbon components with boiling points at least as high as 200° C., which comprises the steps of adding to said material to be deodorized after the completion of substantially all the refining and treating steps to which said material is subjected prior to use a solution of a condensation product of an alkyl-imino-phenol with an organic cobalt salt in an organic solvent, said solution being soluble in said material to be deodorized, and maintaining said added solution in said material to be deodorized for a substantial time and during storage thereof prior to use for reaction therein effecting deodorizing thereof and preventing formation therein of odoriferous components during storage.

2. A method in accordance with claim 1 including the further step of adding to said solution an organic lead salt soluble therein.

3. A method in accordance with claim 1 in which said alkyl-imino-phenol is a Schiff base resulting from the condensation of an ortho-hydroxy-benzaldehyde with an aliphatic diamine.

4. A method in accordance with claim 1 in which said organic solvent is cresol.

5. A method in accordance with claim 1 in which said organic solvent is methanol.

6. A method in accordance with claim 1 in which said organic solvent is toluene.

7. A method in accordance with claim 1 in which said organic solvent is aromatic petroleum solvent.

8. A method for deodorizing fuel oil, thermal and catalytic cycle petroleum distillate stocks, petroleum middle distillates, and like petroleum distillation fractions, having a preponderant proportion of hydrocarbon components with boiling points at least as high as 200° C., which comprises adding to said material to be deodorized after the completion of substantially all the refining and treating steps to which said material is subjected prior to use a solution of an alkyl-imino-phenol and an organic cobalt salt in an organic solvent, said solution being soluble in said material to be deodorized, and maintaining said added solution in said material to be deodorized for a substantial time and during storage thereof prior to use for reaction therein effecting deodorizing thereof and preventing formation therein of odoriferous components during storage.

9. A method in accordance with claim 8 in which said alkyl-imino-phenol is a Schiff base resulting from the condensation of an ortho-hydroxy-benzaldehyde with an aliphatic diamine.

10. A method in accordance with claim 8 in which said organic solvent is cresol.

11. A method in accordance with claim 8 in which said organic solvent is methanol.

12. A method in accordance with claim 8 in which said organic solvent is toluene.

13. A method in accordance with claim 8 in which said organic solvent is aromatic petroleum solvent.

References Cited in the file of this patent

UNITED STATES PATENTS

| | | |
|---|---|---|
| 2,361,339 | White et al. | Oct. 24, 1944 |
| 2,486,538 | Thompson | Nov. 1, 1949 |
| 2,513,669 | Partridge | July 4, 1950 |
| 2,523,549 | Axe | Sept. 26, 1950 |
| 2,533,205 | Chenicek | Dec. 12, 1950 |
| 2,573,779 | Walters | Nov. 6, 1951 |
| 2,621,147 | Oosterhout et al. | Dec. 9, 1952 |
| 2,651,595 | Moulthrop | Sept. 8, 1953 |
| 2,659,691 | Gislon et al. | Nov. 17, 1953 |
| 2,823,173 | Gislon et al. | Feb. 11, 1958 |

FOREIGN PATENTS

| | | |
|---|---|---|
| 395,192 | Great Britain | July 13, 1933 |